US009989300B1

(12) United States Patent
Shuntich (10) Patent No.: US 9,989,300 B1
(45) Date of Patent: Jun. 5, 2018

(54) MODULAR REFRIGERATION DEVICE

(71) Applicant: SuperCooler Technologies, Inc., Ocoee, FL (US)

(72) Inventor: Douglas John Shuntich, Ocoee, FL (US)

(73) Assignee: Supercooler Technologies, Inc., Maitland, FL (US)

( * ) Notice: Subject to any disclaimer, the term of this patent is extended or adjusted under 35 U.S.C. 154(b) by 718 days.

(21) Appl. No.: 14/526,436

(22) Filed: Oct. 28, 2014

Related U.S. Application Data (60) Provisional application No. 61/961,905, filed on Oct. 28, 2013, provisional application No. 61/963,045, filed on Nov. 22, 2013, provisional application No. 61/963,571, filed on Dec. 9, 2013.

(51) Int. Cl.
| | |
|---|---|
| F25D 17/04 | (2006.01) |
| F25D 11/02 | (2006.01) |
| F25D 29/00 | (2006.01) |
| F25D 17/06 | (2006.01) |

(52) U.S. Cl.
CPC .............. *F25D 29/00* (2013.01); *F25D 11/02* (2013.01); *F25D 17/065* (2013.01); *F25D 2317/066* (2013.01); *F25D 2317/0671* (2013.01); *F25D 2500/06* (2013.01); *F25D 2700/12* (2013.01); *F25D 2700/14* (2013.01)

(58) Field of Classification Search
CPC .... A23B 7/152; F25D 17/042; F25D 2700/06
USPC ............................ 62/176, 441, 408, 407, 186
See application file for complete search history.

(56) References Cited

U.S. PATENT DOCUMENTS

| | | | |
|---|---|---|---|
| 2,736,174 | A | 2/1956 | Tice |
| 4,023,947 | A | 5/1977 | Ferry |
| 4,132,186 | A | 1/1979 | Manske |
| 4,142,372 | A | 3/1979 | Kato et al. |
| 4,358,932 | A | 11/1982 | Helfrich et al. |
| 4,358,934 | A | 11/1982 | VanKirk |
| 4,457,214 | A | 7/1984 | Devries |
| 4,825,665 | A | 5/1989 | Micallef |
| 4,954,465 | A | 9/1990 | Kawashima et al. |
| 4,961,322 | A | 10/1990 | Oguma et al. |
| 5,144,816 | A | 9/1992 | Chase |
| 5,240,177 | A | 8/1993 | Muramatsu et al. |
| 5,282,368 | A | 2/1994 | Ordoukhanian |

(Continued)

FOREIGN PATENT DOCUMENTS

| | | |
|---|---|---|
| JP | 2012153614 | 11/2012 |
| KR | 20080088944 | 10/2008 |

(Continued)

OTHER PUBLICATIONS

Shields, New Refrigeration Tech Cools Drink in 45 seconds, Food & Drink International, 2014, www.fdiforum.net, 3 pages.

(Continued)

*Primary Examiner* — Henry Crenshaw
(74) *Attorney, Agent, or Firm* — Brian S. Steinberger; Law Offices of Brian S. Steinberger, P.A.

(57) ABSTRACT

A refrigerator includes a refrigerating compartment configured to preserve food, the compartment including a plurality of walls forming a cavity, a door coupled to the compartment configured to cover the refrigeration space when in a closed position, and a passageway positioned on at least one of the walls and the door such that air within the cavity is in fluid communication with air outside the cavity when the door is in the closed position.

20 Claims, 5 Drawing Sheets

(56) References Cited

U.S. PATENT DOCUMENTS

| | | |
|---|---|---|
| 5,388,427 A | 2/1995 | Lee |
| 5,901,564 A | 5/1999 | Comeau, II |
| 5,964,101 A | 10/1999 | Schulak et al. |
| 5,966,964 A | 10/1999 | Pattee |
| 6,146,600 A | 11/2000 | Williamson |
| 6,253,559 B1 | 7/2001 | Kinkel et al. |
| 6,272,867 B1 | 8/2001 | Barrash et al. |
| 6,314,751 B1 | 11/2001 | Gjersvik |
| 6,408,634 B1 | 6/2002 | Choi |
| 6,904,761 B2 | 6/2005 | Rafalovich et al. |
| 6,945,069 B2 | 9/2005 | Lee |
| 7,032,408 B2 | 4/2006 | Dentella et al. |
| 7,287,397 B2 | 10/2007 | Coulter et al. |
| 7,296,422 B2 | 11/2007 | Strohm et al. |
| 7,703,295 B2 | 4/2010 | Zangari et al. |
| 7,934,384 B2 | 5/2011 | Tuskiewicz et al. |
| 7,997,094 B2 | 8/2011 | Zangari et al. |
| 8,225,620 B2 | 7/2012 | Strohm et al. |
| 8,250,881 B1 | 8/2012 | Reihl |
| 8,434,317 B2 | 5/2013 | Besore |
| 8,464,544 B2 | 6/2013 | Shin et al. |
| 8,534,085 B2 | 9/2013 | Zangari et al. |
| 8,572,990 B2 | 11/2013 | Chung et al. |
| 9,134,059 B2 | 9/2015 | Chung et al. |
| 9,234,697 B2 | 1/2016 | Youn et al. |
| 9,841,224 B2 | 12/2017 | Hitzelberger et al. |
| 2003/0090890 A1 | 5/2003 | Miozza et al. |
| 2004/0237544 A1 | 12/2004 | Ueno et al. |
| 2005/0142268 A1 | 6/2005 | Scullion et al. |
| 2005/0217282 A1 | 10/2005 | Strohm et al. |
| 2006/0185372 A1 | 8/2006 | Conde Hinojosa |
| 2006/0248904 A1 | 11/2006 | Ludwig |
| 2006/0260345 A1 | 11/2006 | Coulter et al. |
| 2006/0260346 A1 | 11/2006 | Coulter et al. |
| 2006/0260347 A1 | 11/2006 | Coulter et al. |
| 2006/0260349 A1 | 11/2006 | Coulter et al. |
| 2006/0260351 A1 | 11/2006 | Coulter et al. |
| 2007/0163289 A1 | 7/2007 | Hahm et al. |
| 2008/0016886 A1 | 1/2008 | Slate et al. |
| 2008/0148751 A1 | 6/2008 | Swofford |
| 2008/0302114 A1 | 12/2008 | Kelly et al. |
| 2009/0314012 A1 | 12/2009 | Lim et al. |
| 2010/0133290 A1 | 6/2010 | Luntz et al. |
| 2010/0154452 A1 | 6/2010 | McCann |
| 2010/0162747 A1 | 7/2010 | Hamel et al. |
| 2010/0205986 A1 | 8/2010 | Chung et al. |
| 2010/0218510 A1 | 9/2010 | Kim et al. |
| 2010/0218514 A1 | 9/2010 | Bertolini et al. |
| 2010/0218542 A1 | 9/2010 | McCollough et al. |
| 2011/0219805 A1 | 9/2011 | Youn et al. |
| 2011/0308264 A1 | 12/2011 | Youn |
| 2012/0047922 A1 | 3/2012 | Lee et al. |
| 2012/0085116 A1 | 4/2012 | Maeng et al. |
| 2012/0137720 A1 | 6/2012 | Ueda et al. |
| 2012/0106130 A1 | 10/2012 | Beaudette |
| 2012/0266619 A1 | 10/2012 | Shaw |
| 2013/0015753 A1 | 1/2013 | Son et al. |
| 2013/0055744 A1 | 3/2013 | Travers |
| 2013/0167582 A1 | 7/2013 | Jones |
| 2013/0171920 A1 | 7/2013 | Bhattacharya |
| 2013/0196044 A1 | 8/2013 | Winston et al. |
| 2013/0205809 A1 | 8/2013 | Beni et al. |
| 2013/0241386 A1 | 9/2013 | Kim et al. |
| 2013/0255304 A1 | 10/2013 | Cur et al. |
| 2013/0305752 A1 | 11/2013 | Martin |
| 2014/0123690 A1 | 5/2014 | Hanley et al. |
| 2014/0125212 A1 | 5/2014 | Choo et al. |
| 2014/0216096 A1 | 8/2014 | Leclear et al. |
| 2014/0346942 A1 | 11/2014 | Kim et al. |
| 2014/0373567 A1 | 12/2014 | Otsuki et al. |
| 2014/0375198 A1 | 12/2014 | Jeon et al. |
| 2015/0059398 A1 | 3/2015 | Yoo et al. |
| 2015/0068235 A1 | 3/2015 | Travers |
| 2015/0102717 A1 | 4/2015 | Furr et al. |
| 2015/0102718 A1 | 4/2015 | Liu et al. |
| 2015/0128483 A1 | 5/2015 | Krupp et al. |
| 2016/0209098 A1 | 7/2016 | Kim |
| 2017/0353327 A1 | 12/2017 | Doberstein et al. |

FOREIGN PATENT DOCUMENTS

| | | |
|---|---|---|
| KR | 20100018887 | 2/2010 |
| WO | 2010042662 | 4/2010 |

OTHER PUBLICATIONS

Shuntich, D.J., PCT Serial No. PCT/US14/47214, filed Aug. 4, 2016, Notification Concerning Transmittal of the International Preliminary Report on Patentability (Chapter 1 of the Patent Cooperation Treaty) (PCT Rule 44bis.1 (c)), dated Aug. 4, 2016, 13 pages.

Shuntich, D.J., PCT Serial No. PCT/US2015/034418, filed Jun. 5, 2015 Notification Concerning Transmittal of International Preliminary Report on Patentability (Chapter I of the Patent Cooperation Treaty)(PCT Rule 44bis.1(c), dated Dec. 15, 2016, 11 pages.

Shuntich, Utility U.S. Appl. No. 14/552,448, filed Nov. 24, 2014, Office Action Summary dated Feb. 8, 2018, 46 pages.

Shuntich, Utility U.S. Appl. No. 14/564,330, filed Dec. 9, 2014, Office Action Summary dated Apr. 13, 2018, 33 pages.

MODULAR REFRIGERATION DEVICE

CROSS REFERENCE TO RELATED APPLICATIONS

This application is a Non-Provisional Application of U.S. Provisional Application No. 61/961,905 filed Oct. 28, 2013, and a Continuation In Part of co-pending U.S. application Ser. No. 14/552,448 filed on Nov. 24, 2014 which application is based on U.S. Provisional Application No. 61/963,045 filed Nov. 22, 2013 and a Continuation In Part of co-pending U.S. application Ser. No. 14/564,330 filed on Dec. 9, 2014, which application is based on U.S. Provisional Application No. 61/963,571 filed Dec. 9, 2013; which Applications are all incorporated herein by reference as if fully contained herein.

FIELD OF THE INVENTION

The present invention relates generally to the preservation of food items, and more particularly to a system and method for retaining freshness of perishable food items.

BACKGROUND OF THE INVENTION

Retaining the freshness of food stored in a refrigerator has been a long-standing desire of consumers. The refrigerators or food preservation systems commonly available typically do not retain the taste, flavor or freshness of food when it is stored over a long period of time. One cause of this may be the way current systems control the operating conditions inside such systems. For instance, refrigerator storage compartments are typically set to maintain a temperature that lies in the range of 32-44 degrees F. regardless of the food items stored in the compartments or the lengths of time the food items are to be stored.

Another issue with current food preservation systems is the lack of control over the loss of water from the stored food due to exposure to cold and dehydrated air. For example, it is a general observation that green beans or leafy vegetables like lettuce can lose water up to 35% of original weight within three weeks of storage in a normal refrigerator pan. Raising the humidity level around the stored food has been shown to help retain food freshness.

Although growth of the bacteria and fungus may be controlled by exposing the food to germicidal or bactericidal environments, over-exposure of the food to these environments can cause some delicate vegetables like lettuce and cabbage to show surface pitting/browning.

SUMMARY OF INVENTION

The invention includes a refrigerator unit having an interior volume defining a refrigerating compartment configured to preserve food. The interior volume is defined by a plurality of interior walls. A door is attached to the unit to cover the interior volume when the door is in a closed position. At least one aperture is positioned in at least one of the interior walls and/or the door such that air within the interior volume is in fluid communication with ambient air outside the unit when the door is in the closed position. The fluid communication can be open or selective.

In another aspect, the invention includes a refrigerator unit having an interior volume defining a refrigerating compartment configured to preserve food. The refrigeration compartment is defined and divided by a plurality of interior walls defining a plurality of interior volumes. A door is attached to the unit to cover the interior volumes when the door is in a closed position. At least one aperture is positioned in at least one of the walls and/or the door such that air within at least one of the interior volumes is in fluid communication with ambient air outside the unit when the door is in the closed position.

In another embodiment, the invention includes a refrigerator unit having a plurality of interior volumes defining a refrigerating compartment configured to preserve food. The interior volumes are defined by a plurality of interior walls. A door is attached to the unit to cover the refrigerating compartment when the door is in a closed position. At least one aperture is positioned in at least one of the walls and/or the door such that air within the interior volumes is in fluid communication with ambient air outside the unit when the door is in the closed position.

The system also includes internal and external temperature sensors, internal and external humidity sensors configured to detect relative humidity levels, an ethylene sensor configured to sense ethylene levels inside the interior volume. The system further includes a controller, responsive to a user interface, the humidity and temperature sensors and the ethylene sensor. In one embodiment, the controller preserves the food stored in the food compartment as a function of the user input, the relative temperatures, relative humidity levels and the ethylene level as a function of a type of the food stored in the food compartment. The controller, responsive to input from the user interface, is configured to receive a relative humidity setting, and maintain the relative humidity within the interior volume at or about the received relative humidity setting by controlling an exchange of ambient air and air within the interior volume.

The system of this embodiment also includes an internal temperature, humidity and ethylene sensor for at least one of the plurality of interior volumes. External humidity and temperature sensors are also used. The system further includes a controller, responsive to a user interface, the temperature sensors, humidity sensors and the ethylene sensor. In one embodiment, the controller preserves the food stored in each interior volume as a function of the user input, the relative temperatures, relative humidity levels and the ethylene level as a function of a type of the food stored in the food compartment. The controller, responsive to input from the user interface, is configured to receive a relative humidity setting, and maintain the relative humidity within the interior volume at or about the received relative humidity setting by controlling an exchange of ambient air and air within the interior volume.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The invention includes a refrigeration system for cooling and controlling humidity in a refrigeration unit comprising an interior volume. There is an inside temperature/humidity sensor disposed within the interior volume and an outside or ambient air temperature/humidity sensor unit outside of the refrigeration unit. Controller is responsive to both inside and ambient sensor units to control the operation of the refrigerator unit. It is possible to include a humidifier that may be controlled by the controller to keep the humidity within the interior volume within a desired range. In a preferred embodiment, however, humidity levels within the interior are maintained through fluid communication with the ambient environment.

It is another aspect of the invention to maintain the temperature within the interior volume within a predetermined range. Specifically, in a preferred embodiment, the temperature within the interior volume is maintained in a range from about 0 (zero) degrees F. to a temperature about or below room temperature (approximately 75 (seventy-five) degrees F.). This range (hereinafter "0-to-room") is much wider than standard refrigeration units, which are generally programmed to provide freezing from −5 to +5 degrees F. for freezing and from +34 to +38 degrees F. for refrigeration.

In contrast, the refrigeration device of the current invention is not limited, nor preset, to any particular range and can therefore be used as a refrigeration or freezer for items in the interior volume. Accordingly, the refrigeration unit can be used for beverages, spirits, and fruit/vegetables or for a variety of precision of refrigeration uses. The design allows freedom of choice for cold storage temperature.

Moreover, the interior volume within the enclosure of the refrigeration system can be divided into multiple interior volumes. Each individual interior volume can be independently controlled with respect to temperature and/or humidity. In an illustrative embodiment, the use of a relatively small interior volume (e.g. 1 cu. Ft. to 5 cu. Ft.) allows the refrigeration unit to achieve and maintain precise temperatures quickly, accurately and efficiently.

The interior volume can define a single refrigeration space or can be equipped with removable thermal-shelves allowing for configuration with multiple interior compartments, each with its own independent precision temperature and humidity control capability. The individual interior volumes utilize precision electronic thermostat(s) and temperature probe(s) to measure temperatures in each compartment and/or temperatures directly within the item(s) placed inside the compartments. Accordingly, the temperature of individual items such as ice-cream, drinks, meats, or other products can be determined to allow for precision temperature control of the items throughout the cooling and storage process. The purpose of the relatively small individually controlled compartments is to allow precision temperature storage for certain items or uses that standard refrigerator/freezers are incapable of or do not do well do to their relatively large interior size with multiple shelves and compartments sharing the same air-space.

For example, a first interior volume can be set to a first temperature setting (e.g. 10 degrees F.) for storing and maintaining ice-cream at a softer consistency than traditional freezers. A second interior volume can be set to second temperature setting (18 degrees F.) which allows for sugared beverages to be stored in a super-cooled state to provide a thicker consistency (i.e. slush-on-demand drinks) than that allowed by most refrigerators. A third interior volume can be set at a third temperature (e.g. 29 degrees F.) to store meats and fish at an ideal temperature for increased shelf-life. A fourth interior volume can be set to a fourth temperature setting (e.g. 57 degrees F.) to store fruits such as bananas, oranges, and tomatoes at a preferred temperature. All of the above mentioned temperatures and uses are things that traditional refrigerators, freezers or combinations thereof do not do, or do not do well.

Temperature and/or humidity for each interior volume are achieved through the use of independently controlled fans (either as a singular space or divided into separate compartments). The movement of air within the interior volume provides temperature regulation, rapid cooling, and air-flow patterns for uniform temperature distributions throughout a given interior volume.

The controller is capable of precise temperature measurement and control. Such controllers are known in the art and illustrative controllers are manufactured by Johnson Controls®, Control Products® and others. In addition, the controller has the added capability of individually controlling temperatures in the multiple compartment configurations and optionally monitoring ambient temperature and compressor temperature to assist in adjusting compressor cycling, cooling times and patterns. A user interface includes a touch pad with digital display and/or touch-screen with a variety of information on set temperatures, actual temperatures, and temperatures vs. time over periods of hours or days. Additionally, specific-use 'quick settings' (e.g. "fruit" or "dairy") are also provided for ease of use.

As discussed above, one aspect of the invention is to provide a refrigeration device with a wide range of temperatures, for one or more interior volumes. Most food items will be stored in interior volumes with a temperature above freezing (i.e. between 32 degrees F. and 65 degrees F.). Additionally, another aspect of the invention includes controlling interior environment parameters such humidity, ethylene gas and fresh air or oxygen.

Control of these parameters are achieved by establishing fluid communication between the interior volume (and volumes) and the ambient environment. Such fluid communication is enhanced through the use of "breathing" fans, communicatively couple to the controller, to cause the interior volume to "breathe" periodically by exchanging, either partially or fully, air within the interior volume and the ambient environment. The 'breathing' fans serve to, inter alia, and introduce warm moist air into the interior volume. The presence of moist air in the interior volume causes condensation to accumulate on the surface of the interior volume, thereby increasing humidity. Additionally, the breathing fans infuse fresh oxygen, which improves respiration for produce, and expels carbon dioxide and built-up odors.

Humidity control is a critical factor for fresh produce as it requires between 90 and 99 percent relative humidity in order to prevent moisture loss. The breathing fans coupled with the internal air-circulating fans, discussed above, create a conducive atmosphere for produce preservation. After the breathing fans infuse moisture from the outside air, condensation rapidly forms upon contact with cold or cool walls of the interior volume. The internal circulating fans cause air to flow over the condensation which causes evaporation and movement of the moisture resulting in a very high relative humidity within the interior volume, thus preventing moisture loss from fresh fruits and vegetables stored in the unit. The controller works, as discussed further below, to ensure that humidity levels work in conjunction with the selected temperature to ensure adequate "breathing" is performed periodically to maintain the desired (usually high) humidity while maintaining the set temperature inside the refrigerated interior space(s).

The breathing fans also allow for ethylene gas levels to be controlled within a given interior volume. Ethylene gas can be expelled to the ambient environment and/or directed (via the breathing fans, the circulating fans, or a combination of both) to specialized ethylene control packets and filters. Ethylene filters can contain potassium permanganate which is a well-known ethylene gas absorber. Ethylene filters can be placed in interior volumes inside the refrigeration unit allowing the user to determine the amount of ethylene that is absorbed (on average). This allows for some amount of 'ripening control' in the sense that less exposure of the ethylene absorbing packets to the internal air will result in more ethylene gas coming in contact with the produce, thus causing faster ripening. More or full exposure of the ethylene absorbing packets/filters will slow the ripening and/or decaying processes inside the unit.

Figure 1:
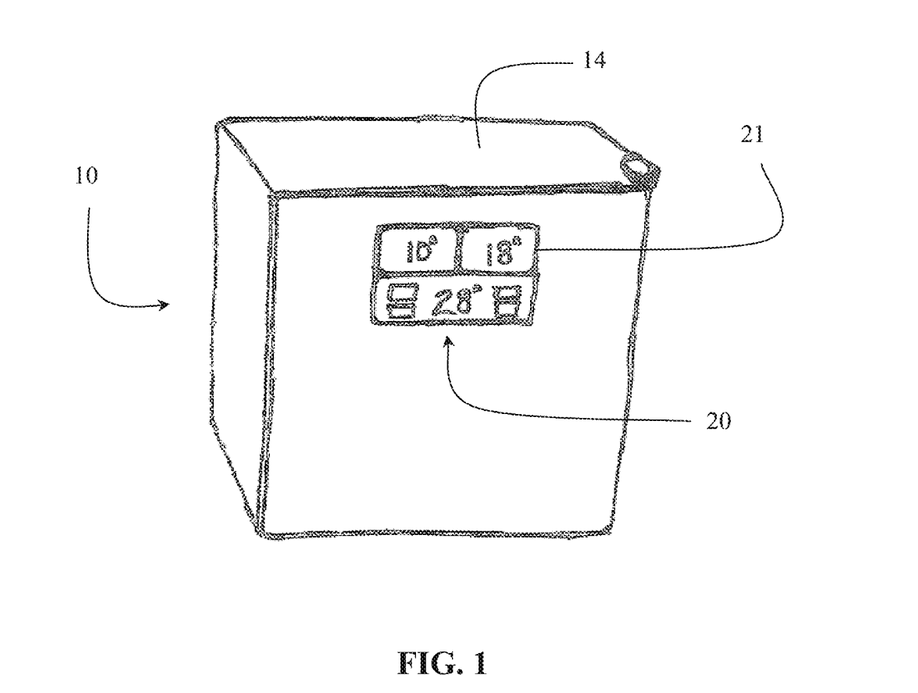
FIG. 1 is a perspective view of the exterior of an illustrative refrigeration system.
Figure 2A:
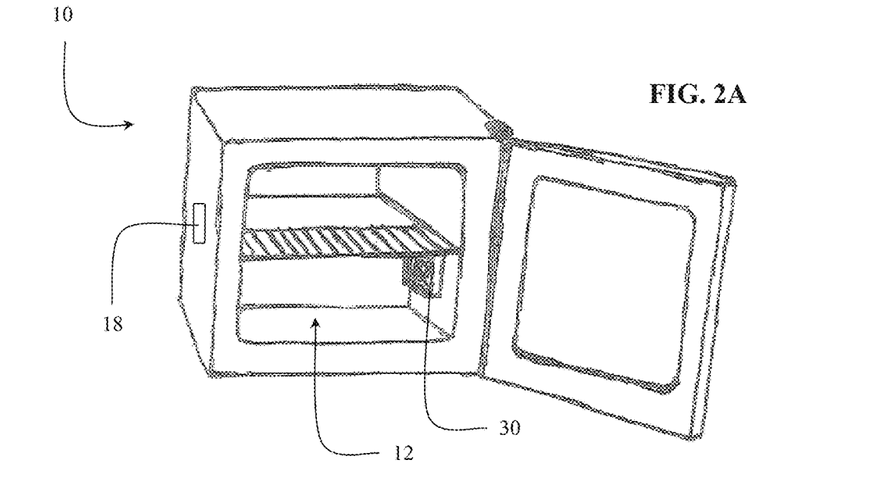
FIG. 2A is a perspective view of the interior of an illustrative refrigeration system.
Figure 2B:
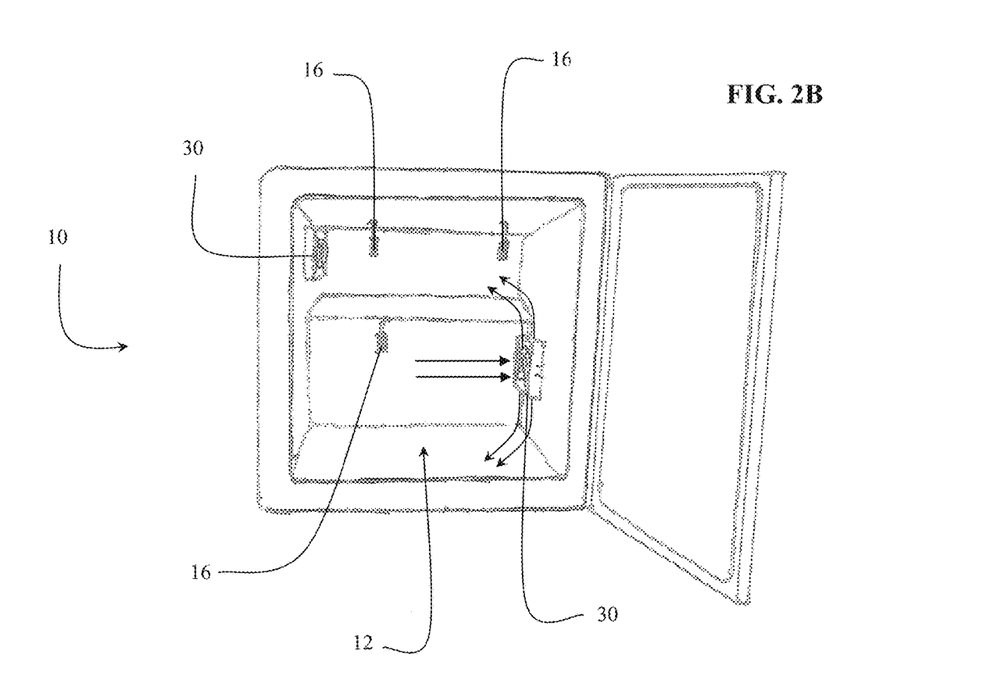
FIG. 2B is a perspective view of the interior of an alternative illustrative refrigeration system.
Figure 3:
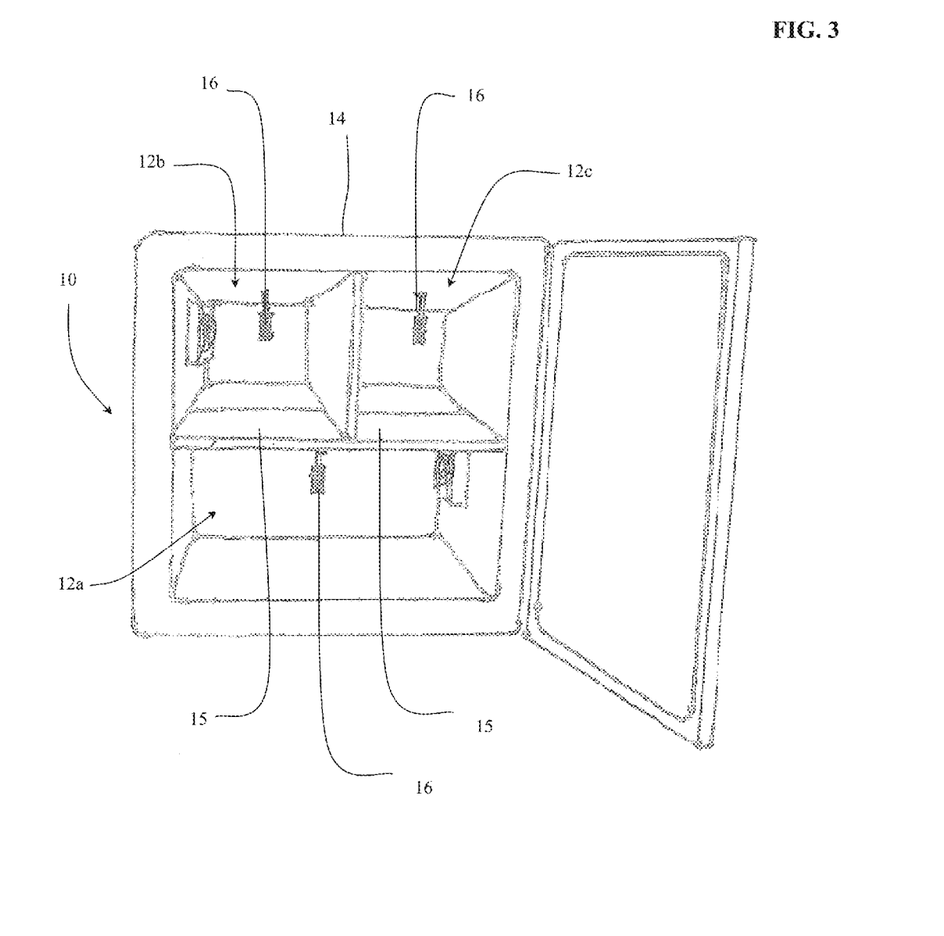
FIG. 3 is a perspective view of the interior of an alternative embodiment of the refrigeration system showing two thermal shelves being inserted to divide the interior space into three independently controlled cold storage compartments or "zones".

As shown in FIGS. 1-3, the invention includes a refrigeration unit 10 for cooling and controlling humidity within an interior volume 12. The interior volume of refrigeration unit 12 is housed within enclosure 14, which defines the outer boundaries of unit 10. The system includes one or more interior volume temperature sensors 16 disposed within interior volume 12. Refrigeration unit 10 may further include one or more circulating fans 30 to circulate cool air or moisture within the interior volume 12. In this manner, controller 20 can actuate circulating fans 30 such that different areas of interior volume reach and are maintained at precise (although potentially) different temperatures and humidity levels. Controller 20 can work independently from pre-programmed instructions or can receive input from user interface 21.

FIG. 3 depicts a refrigeration unit 10 for cooling and controlling humidity within a plurality of interior volumes (12a-12c). Adjustable and modular shelves 15 are used to define the plurality of interior volumes 12a-12c. Interior volumes of refrigeration unit 10 are housed within enclosure 14, which defines the outer boundaries of unit 10. The system includes a plurality of interior volume plurality of interior volume temperature sensors 16, each disposed within an individual interior volume 12a-12c. This arrangement allows refrigeration unit 10 to be configured with singular, dual or multiple interior volumes. Each interior volume can be set and maintained with a different temperature. Shelves 15 are preferably constructed of an insulative material to help maintain the temperature in each interior volume 12a-12c.

Figure 4:
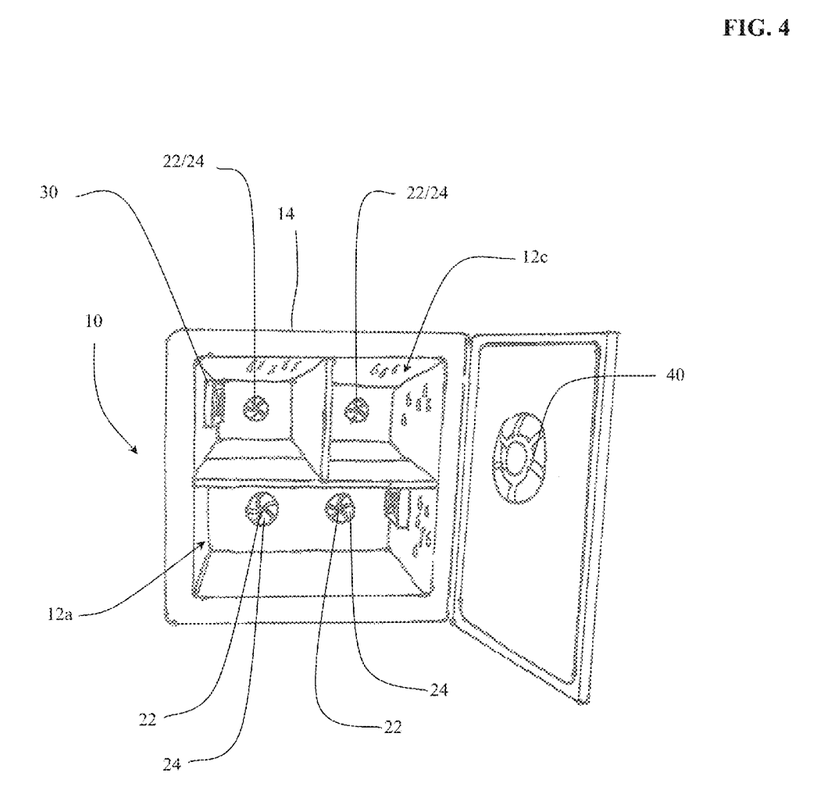
FIG. 4 is a perspective view of the interior of an alternative embodiment of the refrigeration system showing an illustrative humidity control arrangement.

Turning now to FIG. 4, one embodiment of a refrigeration unit 10 for cooling and controlling humidity within an interior volume 12 is shown. The interior volume of refrigeration unit 10 is housed within enclosure 14, which defines the outer boundaries of unit 10. The system includes an interior volume temperature and humidity sensor (16a) disposed within interior volume 12. Ambient temperature and humidity sensor 18a can be on the exterior of enclosure 14 or can be positioned remotely as long as it remains in communication (i.e. wired or wireless) with the system. Controller 20 is communicatively coupled and responsive to both interior sensor 16 and external sensor 18. Controller 20 uses information gathered by the sensors to calculate the dew point for both interior volume 12 and the ambient environment.

Controller 20 responds to the sensor units and the indicated dew points of the enclosure and actuates breathing fans 22 to provide warm ambient air to the enclosure when the humidity inside the interior volume is below a first predetermined value and the ambient humidity is above the humidity within the interior volume by a predetermined differential and the dew point of the ambient air is matched to the humidity range target of the air in the interior volume. Controller 20 also responds to the sensor units 16 and 18 to activate the conventional refrigeration system (not shown) when the humidity of the interior volume is above a predetermined setting. The humidity range may only include a minimum humidity for the interior volume, for cases in which 100% humidity is desired.

FIG. 4 shows an illustrative arrangement of breathing fans 22 which infuse and expel air to/from interior volumes 12a-12c and the ambient environment. Also shown is an adjustable ethylene gas filter 40 or packet holder using potassium permanganate pellets as an ethylene gas absorber. Humidity requirements for fresh produce are typically above 90 percent relative humidity. Circulating fans 30 cause the condensate to re-evaporate directly into the cold space resulting in very high relative humidity conditions within the interior volumes. Circulating fans 30 also assist in moving moist air within the interior volume as desired.

Controller 20 will not actuate breathing fans 22 if the humidity of the air inside interior volume is below the minimum humidity level but the humidity of the ambient air is not high enough to raise the humidity level of the air within the interior volume. Similarly, controller 20 will not actuate breathing fans 22 if the humidity of the air inside interior volume is below the minimum humidity level but the humidity of the ambient air is so low (while being greater than the humidity within the interior volume) that the amount of ambient air required to meet the minimum humidity level would raise the temperature of the interior volume above a predetermined temperature. In some conditions it may be desirable to maintain a humidity level below that ideal for produce. Here, the humidity range may include a maximum humidity in which case controller 20 will not actuate breathing fans 22 if the humidity of the ambient is above that maximum humidity level.

Controller 20 can operate by direct readings of humidity levels or by calculating the dew point of the interior volume and/or ambient environment as the dew point is closely associated with relative humidity. For the purpose of this invention, the dew point is the temperature to which a given volume of air, containing a volume of water, must be cooled at a constant barometric pressure for the volume of water to condense into a liquid state at the same rate at which it evaporates. The dew point is also a saturation temperature.

As such, a high relative humidity indicates that the dew point is approximate to the air temperature. For example, 100% relative humidity indicates that the dew point of a given environment is equal to the current temperature and the air is saturated with water. If the dew point remains constant while temperature increases then relative humidity decreases. Optionally, controller 20 can receive information from a dew point meter or sensors 16 and 18 can provide a dew point reading. If controller 20 receives a dew point reading directly from sensor units 16 and 18 it is unnecessary to calculate the dew point. If, however, controller 20 receives temperature and relative humidity it may calculate the dew point according to any well-known approximation formula, such as the Magnus formula, which calculates the dew point given the relative humidity and the actual temperature of the air.

Accordingly, there may be set a maximum allowable relative humidity within a volume (Hmax) and a minimum allowable relative humidity (Hmin). Controller 20 monitors and compares the temperature and the relative humidity (or dew point) of both the interior volume and the ambient environment at all times. The conventional refrigeration system operates, preferably based on temperature, until either the Hmax or Hmin is reached.

Once the relative humidity is outside of the range set forth by Hmax and Hmin, ambient air is introduced to the interior volume if the relative humidity of the ambient air is such that it would improve or match the relative humidity within the interior once the ambient air is cooled to the predefined temperature within the interior volume. Generally, if there is a range of acceptable humidity with a Hmin for a given interior volume temperature, and the interior volume air is already too dry, then no ambient air with a dew point temperature lower than that of the enclosure air can be used even if it is at 100% relative humidity. Contrastingly, if there is a maximum acceptable humidity for a given enclosure temperature and the enclosure air is already too humid then all ambient air with a dew point temperature lower than the enclosure air can be used if it is cold enough and even if it is at 100% relative humidity. To protect the Hmin range when the ambient air dew point is lower than the minimum humidity, controller 20 may activate an associated humidifier (not shown) to add moisture to the interior volume or the humidifier could be provided with independent controls. An associated humidifier adds the benefit of allowing the ambient air to be used to control other parameters, such as ethylene or other gas levels, even if it contained low humidity.

As shown in FIG. 4, breathing fans 22 are disposed in, and partially obstructing, apertures 24. Apertures 24 extend from interior volume 12 to the exterior surface of enclosure 14 and provide fluid communication between interior volume and the ambient environment. In one embodiment, a filtering member (not shown) is positioned within aperture 24. In another embodiment, the filtering member is adjacent apertures 24 such that air leaving the interior volume contacts the filters. In another embodiment, the area of apertures 24 is selectively controlled by a plurality of louvers positioned at one end of apertures 24. The area of apertures 24 can be controlled manually or by controller 20.

Humidity control within interior volume is thereby achieved by the controlled communication of ambient air with interior volume 12 through apertures 24 through the movement of breathing fans 22. Filters placed within the flow of fluid communication can be used to trap gases, scents and odors within the interior volume as well as to keep foreign particles from entering the interior volume through apertures 24. Though shown on the rear wall of interior volume 12, in FIG. 4, in an alternative embodiment, apertures 24 can be located on the top or side walls of interior volume 12. Apertures 24 can be of any shape and can extend linearly or could extend at least partially arcuately between inner volume 12 and enclosure 14.

In still another embodiment, interior volume 12 is equipped with a gas sensor adapted to sense a level of a gas associated with respiration such as carbon dioxide ($CO_2$) or oxygen ($O_2$). When the gas sensor detects a level of carbon dioxide or oxygen (or a combination thereof) in at least one food compartments outside a predetermined range it actuates the breathing fans to exchange the air in the interior volume with ambient air. This exchange can occur by directing ambient air into the interior volume, expelling air in the interior volume into the ambient environment, or a combination thereof. Additionally, each interior volume can be adapted with two or more apertures and associated breathing fans. In this arrangement, a first breathing fan can be used to introduce ambient air into the interior volume while a second breathing fan can be used to simultaneously expel interior volume into the ambient environment. It is also possible that the aperture lead to an intervening structure, such as a filter or scrubber, between the interior volume and the ambient environment. Circulating fans can also be used to disperse respiration gases throughout the interior volume, direct respiration gases to interior volumes wherein respiration gases are not detrimental or needed, or trap respiration gases in a device in the same manner as with the ethylene gas.

Other advantages of the invention include convenience. In one illustrative embodiment, the refrigeration unit is designed to fit on a standard U.S. kitchen counter-top (which are generally approx. 30" deep) and having a height of approximately 18".

Modularity of Units and Stacking Frame. The modular design provides an entirely new approach to cold food storage in the home, restaurants, or food service establishments. Each unit is designed to be held in a firm support structure whereby the units can be "stacked" in order to provide additional cold storage capability via the use of multiple units. Each unit fits securely in the frame by a locking mechanism that prevents it from falling out of the frame, as shown in FIG. 5.

The frame is designed with a heavy bottom section to maintain a low center of gravity with one, two, or three modular units stacked in the frame. The low center of gravity is required to prevent tipping since each modular unit contains its own individual compressor—evaporator—condenser system and therefore is relatively heavy. Additionally, the design elevates the lower modular unit off the floor to allow for easier access to the lowest unit.

Figure 5:
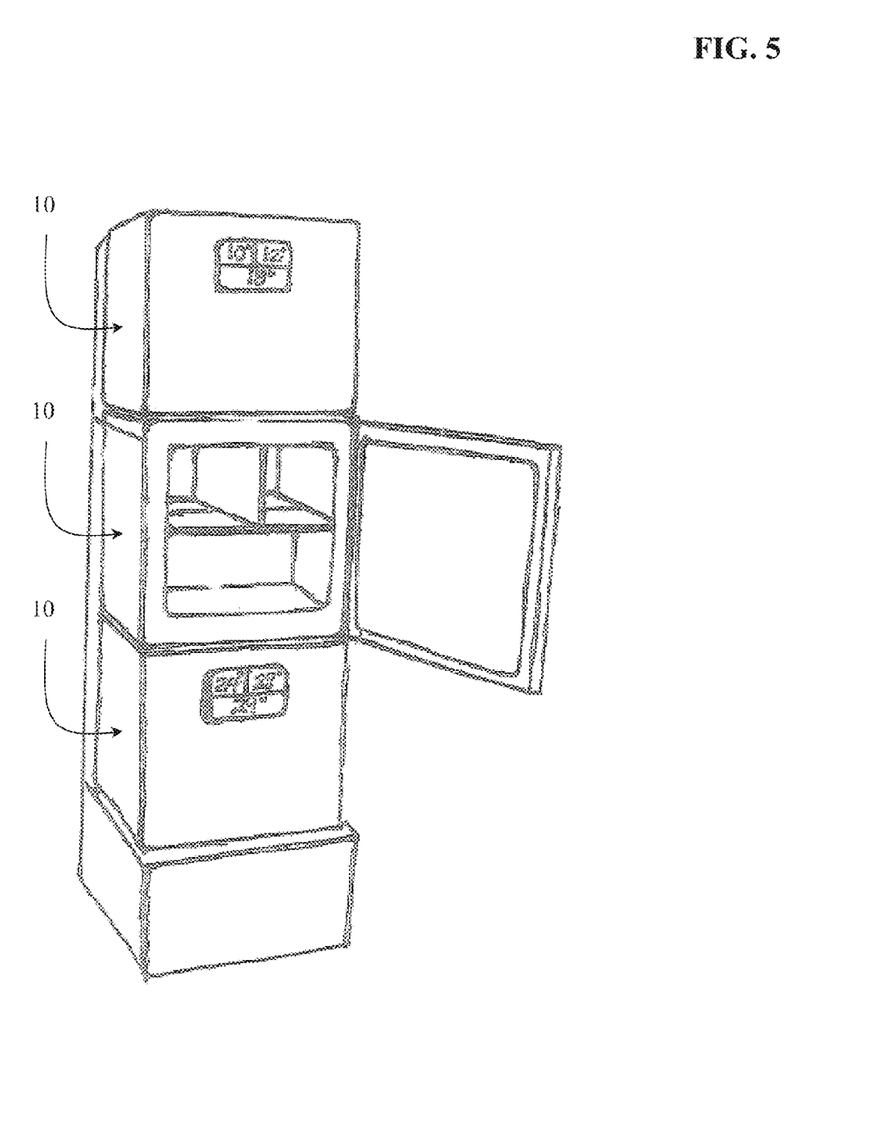
FIG. 5 is a perspective view of an illustrative stackable arrangement.

As shown in FIG. 5, the refrigeration unit 10 is constructed to be modular and thus multiple units (10a-10c) can be stacked or secured in a rack or other enclosure to provide additional refrigeration devices. The modular stacks can also be a wall-mounted bracket system to provide additional safety. In FIG. 5, a typical "stack" consisting of three units placed on a base stand and frame and secured via a rear bracket that acts as a brace for the upper units. The rear bracket is optionally designed to be mounted directly to a wall or floor resulting in stability of the entire stack. This enhances safety and prevents any unwanted movement or shifting of upper units in the stack. The base also raises the lower unit off the floor for easy access, and is optionally designed to be adjustable in height.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. Any materials, which may be cited above, are fully incorporated herein by reference.

It is also to be understood that the following claims are intended to cover all of the generic and specific features of the invention herein described, and all statements of the scope of the invention which, as a matter of language, might be said to fall there between. Relative terminology, such as "substantially" or "about," describe the specified materials, steps, parameters or ranges as well as those that do not materially affect the basic and novel characteristics of the claimed inventions as whole (as would be appreciated by one of ordinary skill in the art). Now that the invention has been described.

What is claimed is:

1. A plurality of modular, stackable refrigerator units in a food preservation system, consisting of:
   a. a first modular refrigerator unit having an interior volume of approximately one cubic foot to approximately five cubic feet defined by a plurality of side walls defining a plurality of food compartments to store food, wherein the first modular refrigerator unit includes
      i. a temperature sensor disposed within each of the plurality of food compartments to sense a temperature within the respective food compartment;
      ii. at least one air circulating fan disposed within the interior volume and positioned to circulate air from one of the plurality of food compartments to a different one of the plurality of food compartments;
   b. a second modular refrigerator unit having an interior volume of approximately one cubic foot to approximately five cubic feet defined by a plurality of side walls defining at least one food compartment to store food, wherein the second modular refrigerator unit includes
      i. a temperature sensor disposed within the at least one food compartment to sense a temperature within the food compartment;
      ii. a first humidity sensor to sense a humidity level inside the at least one food compartment;
      iii. a second humidity sensor to sense a humidity level of the ambient atmosphere outside of the second modular refrigerator unit;
      iv. a plurality of gas sensors adapted to sense a gas level, associated with fresh food ripening or respiring, wherein at least one gas is selected from one of ethylene, carbon dioxide or oxygen inside the at least one food compartment;
      v. at least one aperture disposed in at least one of the plurality of side walls of the interior volume to provide fluid communication between the ambient atmosphere and the at least one food compartment;
      vi. at least one breathing fan disposed in and partially obstructing the at least one aperture in the at least one of the plurality of side walls of the interior volume to direct air through the at least one aperture in at least one direction to provide fluid communication between the interior volume and the ambient environment;
      vii. at least one air circulating fan disposed within the interior volume and positioned to circulate air within the at least one food compartment; and
   c. a controller that operates to preserve the food stored in the interior volume of the first modular refrigerator unit, and simultaneously preserve the food stored in the interior volume of the second modular refrigerator unit, wherein the first modular refrigerator unit and the second modular refrigerator unit are each stacked to fit securely in a frame by a locking mechanism.

2. The food preservation system of claim 1, including at least one circulation fan disposed within the interior volume in the first modular refrigerator unit and positioned to circulate air from one of the plurality of food compartments to a different one of the plurality of food compartments responsive to a signal from the controller.

3. The food preservation system of claim 1, including at least one lateral shelf between at least two side walls of the interior volume in the first modular refrigerator unit.

4. The food preservation system of claim 3, wherein at least one lateral shelf in the interior volume is adjustable.

5. The food preservation system of claim 1, wherein the controller is adapted to maintain a first one of the plurality of food compartments at a first temperature and a second one of the plurality of food compartments at a second temperature in the first modular refrigerator unit.

6. The food preservation system of claim 1, wherein the interior volume of the second modular refrigerator unit includes
   the at least one breathing fan in operative communication with the at least one aperture disposed in the at least one of the plurality of sidewalls to direct air through the at least one aperture in at least one direction responsive to a signal from the controller.

7. The food preservation system of claim 1, wherein the controller is responsive to the temperature sensor, the first humidity sensor, and the second humidity sensor to sense a humidity level of the ambient atmosphere and a predetermined humidity level of the at least one food compartment and the ambient air for actuating the at least one breathing fan to direct ambient air to the at least one food compartment when humidity inside the at least one food compartment is below a first predetermined humidity level and the ambient humidity is above the at least one food compartment humidity by a predetermined differential humidity.

8. The food preservation system of claim 1, wherein the controller is responsive to the temperature sensor, the first humidity sensor, and the second humidity sensor to sense a humidity level of the ambient atmosphere and a predetermined humidity level of the at least one food compartment and the ambient air for actuating the at least one breathing fan to direct ambient air to the at least one food compartment when humidity inside the at least one food compartment is below a first predetermined humidity level and the ambient humidity is above the at least one food compartment humidity by a predetermined differential humidity and the dew point of the ambient air is matched to the dew point range of the air in the interior volume.

9. The food preservation system of claim 1, wherein one of the plurality of gas sensors detects a level of ethylene gas in the at least one food compartment of the second modular refrigeration unit and the controller is responsive to the gas sensor for actuating the at least one breathing fan to direct air from the at least one food compartment into the ambient atmosphere when a level of ethylene gas inside the at least one food compartment is above a first predetermined ethylene gas level.

10. The food preservation system of claim 9, including an ethylene gas capture device disposed within the interior volume, wherein the gas sensor detects a level of ethylene gas in the at least one food compartment and the controller is responsive to the gas sensor for actuating the at least one circulating fan to direct air from the at least one food compartment into contact with the ethylene gas capture device when a level of ethylene gas inside the at least one food compartment is above a first predetermined ethylene gas level.

11. The food preservation system of claim 10, wherein the ethylene gas capture device includes potassium permanganate.

12. The food preservation system of claim 1, wherein one of the plurality of gas sensors detects a level of carbon dioxide in at least one food compartment and the controller is responsive to the gas sensor for actuating the at least one breathing fan to direct air from the at least one food compartment into the ambient atmosphere when a level of carbon dioxide inside the at least one food compartment is above a first predetermined carbon dioxide gas level.

13. The food preservation system of claim 1, wherein one of the plurality of gas sensors detects a level of oxygen in the at least one food compartment and the controller is responsive to the gas sensor for actuating the at least one breathing fan to direct air to the at least one food compartment when a level of oxygen inside the at least one food compartment is outside a first predetermined oxygen gas level.

14. The food preservation system of claim 1, including a user interface operationally coupled to said interior volume, said interface configured to:
  a. receive a temperature setting for each of the plurality of food compartments in the first modular refrigerator unit; and
  b. maintain the temperature within each of the plurality of food compartments at about said setting.

15. A modular, countertop food preservation system, consisting of:
  a. a modular refrigerator unit having an interior volume defined by a plurality of side walls defining at least one food compartment to store food;
  b. a temperature sensor disposed within the at least one food compartments to sense a temperature within the food compartment;
  c. a plurality of air circulating fans affixed to the plurality of sidewalls within the interior volume;
  d. an ethylene gas filter using potassium permanganate pellets as an ethylene gas absorber to slow the ripening or decaying process of produce inside the unit;
  e. a first humidity sensor to sense a humidity level inside the at least one food compartment;
  f. a second humidity sensor to sense a humidity level of the ambient atmosphere outside of the modular refrigerator unit;
  g. at least one aperture disposed in at least one of the plurality of side walls of the interior volume to provide fluid communication between the ambient atmosphere and the at least one food compartment;
  h. at least one breathing fan in operative communication with at least one aperture in at least one of the plurality of side walls of the interior volume to direct air through the at least one aperture in at least one direction; and
  i. a controller that operates to preserve the food stored in the at least one food compartment responsive to the first humidity sensor, the second humidity sensor and the temperature sensors as a function of at least a type of the food stored in the at least one food compartment, wherein the controller is responsive to a predetermined humidity level of the at least one food compartment and the ambient air for actuating the at least one breathing fan to direct ambient air to the at least one food compartment when humidity inside the at least one food compartment is below a first predetermined humidity level and the ambient humidity is above the at least one food compartment humidity by a predetermined differential humidity.

16. The modular, countertop refrigeration system of claim 15, wherein the at least one food compartment to store food is subdivided with shelving into a plurality of food storage sections.

17. The modular, countertop refrigeration system of claim 15, including a user interface operationally coupled to said interior volume, said interface configured to:
  a. receive a temperature setting for the at least one food compartment; and
  b. maintain the temperature within the at least one food compartment at about said setting.

18. The modular, countertop refrigeration system of claim 15, wherein the external enclosure for receiving the interior volume with the at least one food compartment is cube-shaped with dimensions of approximately 30 inches (76.2 cm) deep and a height of approximately 18 inches (45.72 cm).

19. The food preservation system of claim 1, including a user interface operationally coupled to said interior volume, said interface configured to:
  a. receive a temperature setting for the at least one food compartment in the second modular refrigerator unit; and
  b. maintain the temperature within the at least one food compartment at about said setting.

20. A plurality of modular, stackable refrigerator units in a food preservation system comprising:
  a. a first modular refrigerator unit having an interior volume of approximately one cubic foot to approximately five cubic feet defined by a plurality of side walls defining a plurality of food compartments to store food, wherein the first modular refrigerator unit comprises:
    i. a temperature sensor disposed within each of the plurality of food compartments to sense a temperature within the respective food compartment;
    ii. at least one air circulating fan disposed within the interior volume and positioned to circulate air from one of the plurality of food compartments to a different of the plurality of food compartments;
  b. a second modular refrigerator unit having an interior volume of approximately one cubic foot to approximately five cubic feet defined by a plurality of side walls defining at least one food compartment to store food, wherein the second modular refrigerator unit comprises:
    i. a temperature sensor disposed within at least one food compartment to sense a temperature within the food compartment;
    ii. a first humidity sensor to sense a humidity level inside the at least one food compartment;
    iii. a second humidity sensor to sense a humidity level of the ambient atmosphere outside of the second modular refrigerator unit;
    iv. a plurality of gas sensors adapted to sense a gas level, associated with fresh food ripening or respiring, wherein at least one gas is selected from one of ethylene, carbon dioxide or oxygen inside the at least one food compartment;
    v. at least one aperture disposed in at least one of the plurality of side walls of the interior volume to provide fluid communication between the ambient atmosphere and the at least one food compartment;
    vi. at least one breathing fan disposed in and partially obstructing the at least one aperture the at least one of the plurality of sidewalls of the interior volume to direct air through the at least one aperture in at least one direction to provide fluid communication between the interior volume and the ambient environment;

vii. at least one circulating fan disposed within the interior volume and positioned to circulate air within the at least one food compartment; and c. a controller that operates to preserve the food stored in the interior volume of the first modular refrigerator unit and simultaneously cool and control the humidity to preserve the food stored in the interior volume of the second modular refrigerator unit, wherein the first modular refrigerator unit and the second modular refrigerator unit are each stacked to fit securely in a frame by a locking mechanism.

\* \* \* \* \*